(12) United States Patent
Choi et al.

(10) Patent No.: US 10,846,440 B2
(45) Date of Patent: Nov. 24, 2020

(54) SECURITY APPARATUS AND OPERATION METHOD THEREOF

(71) Applicants: ICTK Holdings Co., Ltd., Gyeonggi-do (KR); IUCF-HYU (INDUSTRY-UNIVERSITY COOPERATION FOUNDATION HANYANG UNIVERSITY), Seoul (KR)

(72) Inventors: Byong Deok Choi, Seoul (KR); Dong Kyue Kim, Seoul (KR)

(73) Assignees: IUCF-HYU (INDUSTRY-UNIVERSITY COOPERATION FOUNDATION HANYANG UNIVERSITY), Seoul (KR); ICTK Holdings Co., Ltd., Gyeonggi-do (KR)

( * ) Notice: Subject to any disclaimer, the term of this patent is extended or adjusted under 35 U.S.C. 154(b) by 274 days.

(21) Appl. No.: 15/773,489

(22) PCT Filed: Nov. 3, 2016

(86) PCT No.: PCT/KR2016/012584
§ 371 (c)(1),
(2) Date: Sep. 26, 2018

(87) PCT Pub. No.: WO2017/078427
PCT Pub. Date: May 11, 2017

(65) Prior Publication Data
US 2019/0012487 A1 Jan. 10, 2019

(30) Foreign Application Priority Data
Nov. 3, 2015 (KR) .................. 10-2015-0154108

(51) Int. Cl.
*G06F 21/75* (2013.01)
*G06F 21/88* (2013.01)
(Continued)

(52) U.S. Cl.
CPC .............. *G06F 21/755* (2017.08); *G06F 1/26* (2013.01); *G06F 21/88* (2013.01); *H04L 9/003* (2013.01);
(Continued)

(58) Field of Classification Search
CPC .......... G06F 21/755; G06F 1/26; G06F 21/88; G06F 21/75; H04L 9/32; H04L 9/003; H04L 9/0866; H04L 29/06
(Continued)

(56) References Cited

U.S. PATENT DOCUMENTS 2,011 A * 3/1841 Wemmer ............. B23D 63/162
76/36
4,119,926 A * 10/1978 Frosch ................... H04B 7/216
327/3
(Continued)

FOREIGN PATENT DOCUMENTS

KR 10-0887551 B1 3/2009
KR 10-0926214 B1 11/2009
(Continued)

OTHER PUBLICATIONS

Extended European Search Report issued in European Patent Application No. 16862443 dated Feb. 18, 2019.
(Continued)

*Primary Examiner* — David J Pearson
*Assistant Examiner* — Badri Champakesan
(74) *Attorney, Agent, or Firm* — Marshall, Gerstein & Borun LLP

(57) ABSTRACT

Provided are a security apparatus and an operation method thereof. The security apparatus comprises a core circuit
(Continued)

which performs a security function by using an authentication key such as a secret key provided by a physically unclonable function (PUF). The security apparatus may receive event information indicating that the security apparatus is in a security-vulnerable state such as a case where the security apparatus is stolen or lost. In such case, a power management circuit can apply at least one electrical shock of overvoltage and overcurrent to the security apparatus to cause physical damage to the security apparatus, so that the core circuit does not perform the security function normally.

17 Claims, 8 Drawing Sheets

(51) Int. Cl.
    *H04L 9/32*         (2006.01)
    *H04L 29/06*       (2006.01)
    *G06F 1/26*        (2006.01)
    *H04L 9/00*        (2006.01)
    *H04L 9/08*        (2006.01)

(52) U.S. Cl.
    CPC .............. *H04L 9/0866* (2013.01); *H04L 9/32* (2013.01); *H04L 29/06* (2013.01)

(58) Field of Classification Search
    USPC ........................................................ 713/189
    See application file for complete search history.

(56) References Cited

U.S. PATENT DOCUMENTS

| | | | | |
|---|---|---|---|---|
| 4,534,194 A * | 8/1985 | Aydin | ................. | E05B 47/068 70/276 |
| 5,724,383 A * | 3/1998 | Gold | ....................... | H04B 1/707 341/55 |
| 5,736,777 A * | 4/1998 | Shield | .................... | H01L 23/576 257/379 |
| 5,790,670 A * | 8/1998 | Bramlett | ............ | G08B 13/1409 200/43.09 |
| 5,930,175 A * | 7/1999 | Lakhani | ................. | G11C 5/145 365/185.33 |
| 7,535,373 B2 * | 5/2009 | Dalzell | ................ | G08B 13/128 340/541 |
| 8,694,856 B2 * | 4/2014 | Tuyls | ...................... | H04L 9/002 714/763 |
| 2007/0076513 A1 * | 4/2007 | Yang | .................. | G11C 16/0416 365/230.06 |
| 2009/0196100 A1 * | 8/2009 | Merry, Jr. | .............. | G11C 16/22 365/185.04 |
| 2010/0037325 A1 * | 2/2010 | Westerinen | ............ | H05K 1/141 726/34 |
| 2010/0250968 A1 * | 9/2010 | Sadler | .................... | G06F 21/554 713/193 |
| 2011/0163088 A1 * | 7/2011 | Besling | ................. | H04L 9/3278 219/660 |
| 2012/0151121 A1 * | 6/2012 | Braga | ...................... | G06F 21/79 711/103 |
| 2013/0271178 A1 * | 10/2013 | Pedersen | ................. | G06F 21/76 326/8 |
| 2014/0375353 A1 * | 12/2014 | Sinanoglu | ............. | G06F 30/327 326/8 |
| 2015/0262662 A1 * | 9/2015 | Andre | ................. | G11C 11/1675 365/148 |

FOREIGN PATENT DOCUMENTS

| | | |
|---|---|---|
| KR | 10-1080511 B1 | 11/2011 |
| KR | 10-1139630 B1 | 5/2012 |
| KR | 2012-0112246 A | 10/2012 |
| KR | 2013-0010522 A | 1/2013 |
| KR | 2013-0027571 A | 3/2013 |
| KR | 10-1418962 B1 | 7/2014 |
| WO | WO-02-095550 A2 | 11/2002 |

OTHER PUBLICATIONS

Written Opinion issued in PCT Patent Application No. PCT/KR2016/012584 dated Feb. 3, 2017.

International Search Report issued in PCT Patent Application No. PCT/KR2016/012584 dated Feb. 3, 2017.

* cited by examiner

SECURITY APPARATUS AND OPERATION METHOD THEREOF

TECHNICAL FIELD

Example embodiments relate to a security apparatus and an operation method of the security apparatus, and more particularly, to a method by which a security apparatus copes with an external security attack and a stolen or lost event.

BACKGROUND ART

Secure devices such as a portable communication terminal, a universal subscriber identity module (USIM), a secure digital (SD) card, a micro-SD card, and a smart card are used in a variety of application fields. Such secure device may include secure information that is also referred to as an identification key, an authentication key, and a secret key. The secure information may be used by a core circuit that performs a security authentication such as a crypto-coprocessor.

When a security device of an authenticated user A is stolen or lost, an unauthenticated user B may obtain the security device, which may lead to a fraudulent use of the security device. As such, a counteraction may need to be taken to prevent the security device from being normally used when a stolen or lost event of the security device occurs. In a related art, when a stolen/lost report is received, an access such as disallowing a transaction may be applied to a counterpart terminal connected to a security device or a server performing a financial transaction as the counteraction.

The secure information may be provided by a physically unclonable function (PUF). The PUF may provide an unpredictable digital value. Even when a manufacturing process is precisely designed and PUFs are manufactured in the same process, the PUFs may provide different digital values. The PUF may also be referred to as physical one-way function practically impossible to be duplicated (POWF).

Such an unduplicable characteristic of the PUF may be applied to generate an identifier of a device for security and/or authentication. For example, the PUF may be used to provide a unique key to distinguish devices from one another.

Korean Patent No. 10-1139630 (hereinafter, referred to as patent '630) and Korean Patent No. 10-0926214 (hereinafter, referred to as patent '214) disclose methods of implementing a PUF. The patent '630 and the patent '214 may provide secure information based on a semiconductor process variation through hardware.

U.S. Pat. No. 8,694,856 (hereinafter, referred to as patent '856) relates to a prevention of a security attack to a PUF. The patent '856 suggests a security attack prevention that over-writes a memory value in response to a security attack using a low temperature exposure method on a PUF.

DISCLOSURE OF INVENTION

Technical Solutions

According to an aspect, there is provided a security apparatus including: a core circuit configured to perform a security function using an authentication key; and a power management circuit configured to, when event information indicating that the security apparatus is in a security-vulnerable state is received, apply at least one electrical shock of overvoltage and overcurrent to the security apparatus to cause a physical damage to the security apparatus such that the core circuit does not perform the security function normally.

When the event information is received, the power management circuit may be configured to apply the electrical shock to the core circuit to physically damage at least a portion of the core circuit. However, embodiments are not limited thereto. For example, the power management circuit may not directly damage the core circuit in response to the event information being received.

The power management circuit may be configured to apply the electrical shock to a power supply path to the core circuit such that the core circuit does not perform the security function normally. The security apparatus may further include a metal oxide semiconductor capacitor (MOSCAP) element connected in parallel with the core circuit in the power supply path. When the event information is received, the power management circuit may be configured to apply the electrical shock to the MOSCAP element such that the MOSCAP element forms a current path for bypassing both ends of the core circuit on the power supply path.

The security apparatus may further include an anti-fuse element connected in parallel with the core circuit in the power supply path. When the event information is received, the power management circuit may be configured to apply the electrical shock to the anti-fuse element such that the anti-fuse element forms a current path for bypassing both ends of the core circuit on the power supply path.

The security apparatus may further include a fuse element connected in series with the core circuit in the power supply path. When the event information is received, the power management circuit may be configured to apply the electrical shock to the fuse element such that the fuse element opens the power supply path to block a current path to the core circuit.

The event information may include an identification code for a stolen or lost security apparatus state received from at least one of an external terminal and a server connected to the security apparatus. For example, the security apparatus may sense the stolen or lost security apparatus state and generate the event information instead of receiving the event information from an external source.

The security apparatus may further include a sensor configured to sense a security attack on the security apparatus. The event information may include an identification code of an event in which the sensor senses the security attack. For example, the security attack may include, but not be limited to, at least one of destruction of a device packaging for an invasive attack, detection of an electromagnetic field for a non-invasive attack, and signal collection for a power analysis attack.

According to another aspect, there is also provided a security apparatus including: a key provider having an authentication key; a core circuit configured to perform a security function using the authentication key received from the key provider; and a control logic configured to, when event information indicating that the security apparatus is in a security-vulnerable state is received, disallow the authentication key to be transmitted from the key provider to the core circuit such that the core circuit does not perform the security function normally.

The control logic may include a selector configured to select the authentication key provided by the key provider or a random key different from the authentication key based on an enable signal value. The selector may include, for example, a multiplexer (MUX) element. When the event information is received, the control logic may be configured to change the enable signal value such that the random key is provided to the core circuit instead of the authentication key.

The key provider may include a physically unclonable function (PUF) that provides a random time-invariant digital value using a semiconductor processing variation. The authentication key may include one of a first digital value provided directly from the PUF and a second digital value generated using the first digital value.

The control logic may include a gate configured to perform an AND operation on an enable signal value and a value of the authentication key. The control logic may be configured to, when the event information is not received, maintain the enable signal value at a logic value of "1" such that the authentication key is provided to the core circuit. The control logic may be configured to, when the event information is received, change the enable signal value to a logic value of "0" such that the authentication key is not provided to the core circuit.

The control logic may include a gate configured to perform an OR operation on an enable signal value and a value of the authentication key. The control logic may be configured to, when the event information is not received, maintain the enable signal value at a logic value of "0" such that the authentication key is provided to the core circuit. The control logic may be configured to, when the event information is received, change the enable signal value to a logic value of "1" such that the authentication key is not provided to the core circuit.

The gate performing the AND operation may be replaced by a gate performing a NAND operation. The gate performing the OR operation may be replaced by a gate performing a NOR operation. It is to be understood that the logic circuits described in the specification may be replaced by equivalent logic circuits having the same function and that such modified circuits are understood to be included in the example embodiments of the present disclosure to the extent that they can be understood and predicted by those skilled in the art.

The event information may include at least one of a first identification code used for identifying a stolen state of a security apparatus, a second identification code used for identifying a lost state of the security apparatus, and a third identification code used for identifying a state in which a security attack to the security apparatus is sensed. The control logic may include a selector configured to receive different enable signals based on the event information and output different values corresponding to the enable signals.

According to still another aspect, there is also an operation method of a security apparatus, the method including: performing, by a core circuit, a security function using an authentication key; and applying, by a power management circuit, at least one electrical shock of overvoltage and overcurrent to the security apparatus to cause a physical damage to the security apparatus such that the core circuit does not perform the security function normally when event information indicating that the security apparatus is in a security-vulnerable state is received. When the event information is received, the power management circuit may be configured to apply the electrical shock to the core circuit to physically damage at least a portion of the core circuit. When the event information is received, the power management circuit is configured to apply the electrical shock to a power supply path to the core circuit such that the core circuit does not perform the security function normally.

BEST MODE FOR CARRYING OUT THE INVENTION

Hereinafter, example embodiments will be described in detail with reference to the accompanying drawings. It should be understood, however, that there is no intent to limit this disclosure to the particular example embodiments disclosed. Like numbers refer to like elements throughout the description of the figures.

Terminologies used herein are defined to appropriately describe the example embodiments of the present disclosure and thus may be changed depending on a user, the intent of an operator, or a custom. Accordingly, the terminologies must be defined based on the following overall description of this specification.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
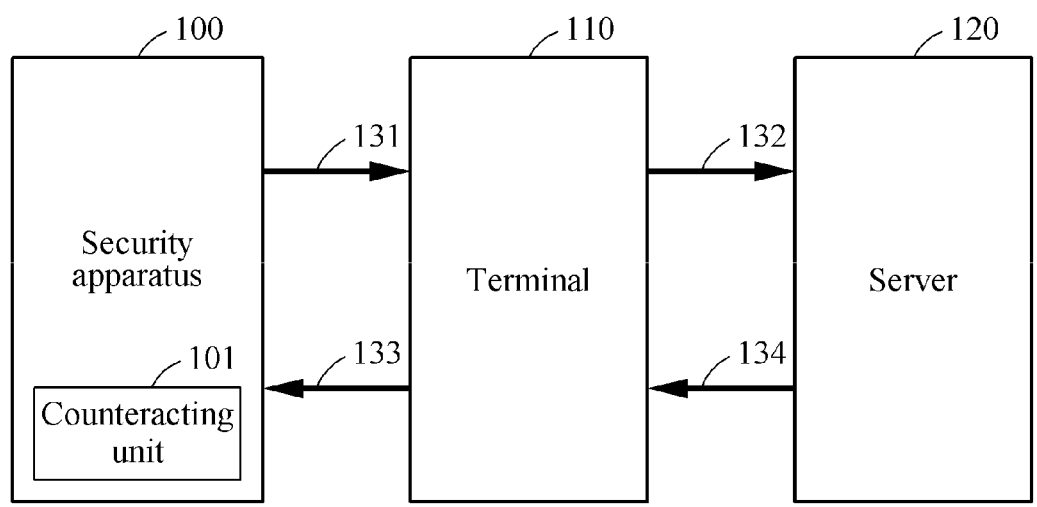
FIG. 1 is a diagram illustrating a security apparatus connected to an external terminal and a server to perform data processing according to an example embodiment.

FIG. 1 is a diagram illustrating a security apparatus 100 connected to an external terminal, for example, a terminal 110 and a server 120 to perform data processing according to an example embodiment. The security apparatus 100 and the terminal 110 may be in contact or/and contactless connection and mutually connected through a wired or wireless communication network. The terminal 110 and the server 120 may be mutually connected through a wired or wireless communication network. As such, the security apparatus 100, the terminal 110, and the server 120 may be connected to one another in various manners. The security apparatus 100 may be a device, for example, a personal communication terminal such as a smartphone, and a general-use computer. Also, the security apparatus 100 may be a security element such as a universal subscriber identity module (USIM), a secure digital (SD) card, a micro-SD card, a smart card, and the like.

The security apparatus 100 may have secure information which may also be referred to as, for example, an identification key, an authentication key, and a secret key. For example, the secure information is to be provided by a PUF. Also, the secure information may be used by a core circuit or a chip that performs a security authentication such as a crypto-coprocessor. Hereinafter, the terms "circuit" may refer to a circuit implemented using hardware components and software components, and may be provided in a form such as a chip, a processor, an arithmetic unit (ALU), and a part thereof.

When the security apparatus 100 a user is stolen or lost, an unauthenticated user may obtain the security apparatus 100, which may lead to a fraudulent use of the security device. According to an example embodiment, when the security apparatus 100 is stolen, lost, or in a security-vulnerable state in which an external security attack is detected, the security apparatus 100 may destroy or damage at least a portion of the security apparatus 100 such that a normal use is unavailable.

According to another example embodiment, when the security apparatus 100 is in the security-vulnerable state, the security apparatus 100 may change secure information used for a security authentication to another value instead of damaging a circuit thereof. Also, instead of changing a value, the security apparatus 100 may output a code by which a type of security vulnerability is identified. In the present disclosure, a counteracting unit 101 may be a circuit that counteract the security-vulnerable state by, for example, destroying/damaging a circuit, or deactivating or changing the security information. The counteracting unit 101 may be understood as at least a portion of a circuit included in the security apparatus 100 or a functional block of the circuit instead of a distinguishable portion in the security apparatus 100.

The security apparatus 100 may be used, as indicated by reference numeral 131, such that information on the security apparatus 100 is transmitted to the terminal 110. The information may be transferred, as indicated by reference numeral 132, from the terminal 110 to the server 120 that performs, for example, financial/security functions. When the security apparatus 100 has been registered as a stolen or lost device, the server 120 may verify that the security apparatus 100 is the stolen or lost device based on the received information on the security apparatus, and respond, as indicated by reference numeral 134, to the terminal 110 using such event information. The terminal 110 may transfer, as indicated by reference numeral 133, the event information to the security apparatus 100 such that the counteracting unit 101 performs a processing corresponding to the security-vulnerable state. The processing may be, for example, destroying/damaging a circuit, or deactivating or changing the security information as described above.

As further discussed below, the security-vulnerable state may include a case in which the security apparatus 100 autonomously detects the security-vulnerable state and sends a report to the server 120 through the terminal 110 as well as a case in which information indicating that the security apparatus 100 is stolen or lost is previously registered on the server 120 or verified by the server 120 in real time. The security apparatus 100 may autonomously discovers/detects at least one of security attacks such as destruction of a device packaging for an invasive attack, detection of an electromagnetic field for a non-invasive attack, and signal collection for a power analysis attack and report on the detected security attack to the server 120. In addition to the aforementioned security attacks, security attacks may include a random security attack.

Figure 2:
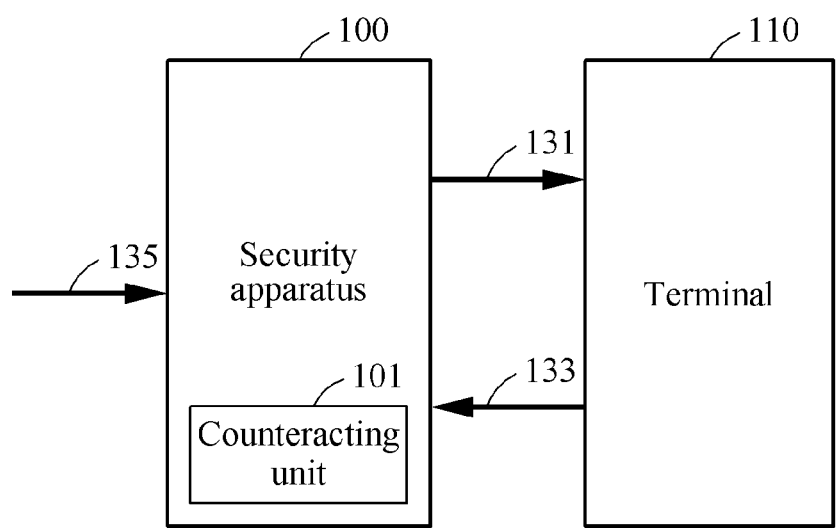
FIG. 2 is a diagram illustrating an operation method of a security apparatus according to an example embodiment.

Although the example of FIG. 1 is an application involving the server 120, it is also possible that the server 120 is not used in such process. FIG. 2 is a diagram illustrating an operation method of the security apparatus 100 according to an example embodiment. The process may be a process in which the security apparatus 100 is connected to the terminal 110 to perform a data processing. A relationship between the security apparatus 100 and the terminal 110 may be a machine to machine (M2M) connection or an Internet of Things (IoT) connection.

The security apparatus 100 may be used, as indicated by reference numeral 131, such that information on the security apparatus 100 is transmitted to the terminal 110. When the security apparatus 100 has been registered as a stolen or lost device, the terminal 110 may verify that the security apparatus 100 is the stolen or lost device and transfer, as indicated by reference numeral 133, event information to the security apparatus. The counteracting unit 101 may perform a processing corresponding to the security-vulnerable state. The processing may be, for example, destroying/damaging a circuit, or deactivating or changing the security information as described above.

The security-vulnerable state may include a case in which information indicating that the security apparatus 100 is stolen or lost is previously registered on the terminal 110 or verified by the terminal 110 in real time. Furthermore, the information may be transferred, as indicated by reference numeral 135, directly to the security apparatus 100 instead of being registered on and/or referenced by the terminal 110. Similar to the example of FIG. 1, the processing may also include a case in which the security apparatus 100 autonomously detects the security-vulnerable state and reports on the security-vulnerable state to the terminal 110. In this example, the detection of the security-vulnerable state may be a case in which at least one of security attacks such as destruction of a device packaging for an invasive attack, detection of an electromagnetic field for a non-invasive attack, and signal collection for a power analysis attack is detected by the security apparatus 100 or an external device (not shown) that communicates therewith.

Figure 3:
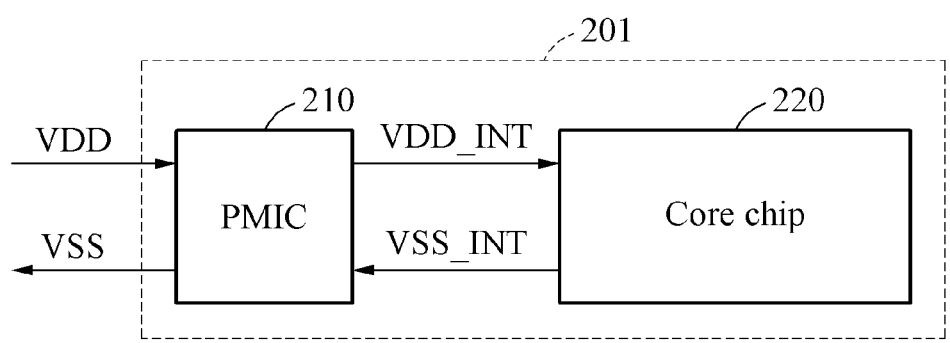
FIG. 3 is a block diagram illustrating a security apparatus that damages at least a portion of a circuit in a security-vulnerable state according to an example embodiment.

FIG. 3 is a block diagram illustrating a security apparatus 201 that damages at least a portion of a circuit in a security-vulnerable state according to an example embodiment. A core circuit or a core chip (hereinafter, also referred to as "core circuit") 220 may perform a security function using an authentication key, for example, a secret key provided by a PUF. A security apparatus 201 may receive event information indicating that the security apparatus is in a security-vulnerable state such as a stolen or lost state. A power management integrated circuit (PMIC) 210 may apply at least one electrical shock of overvoltage and overcurrent to the security apparatus to cause a physical damage/destruction to at least a portion of the security apparatus 201 such that the core circuit may not perform the security function normally. When the event information is received, the PMIC 210 may apply at least one of the electrical shock of overvoltage and overcurrent to the security apparatus to cause a physical damage to the security apparatus 201 such that the core circuit may not perform the security function normally. The electrical shock may be a method causing a breakdown of a semiconductor element in the core circuit 220 due to the application of the overvoltage. Also, the electrical shock may be a method causing an electromigration in the core circuit 220 due to the application of the overcurrent. It should be understood that the type of damage or the specific result may vary depending on the application or case and that any physical damage that interferes with the normal operation of the core circuit 220 is included in such application.

Figure 4:
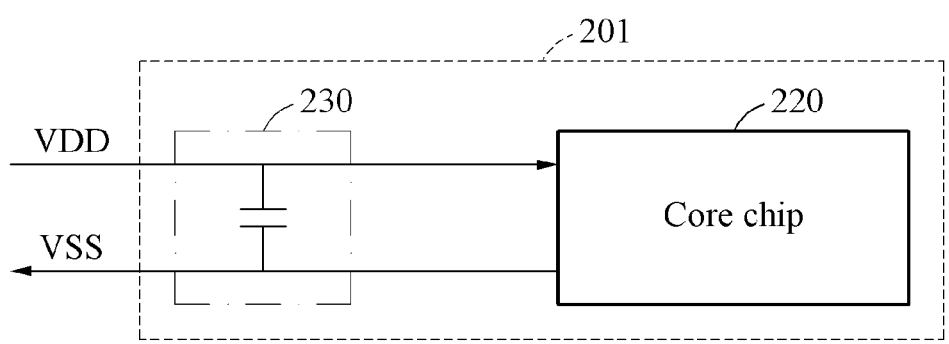
FIGS. 4 through 7 are diagrams illustrating examples of implementing a security apparatus according to an example embodiment.

FIGS. 4 through 7 are diagrams illustrating examples of implementing a security apparatus according to an example embodiment. A power management circuit may apply an electrical shock to a power supply path toward a core circuit to cause a physical damage to a security apparatus such that the core circuit may not perform a security function normally. Referring to FIG. 4, the security apparatus 201 may further include a metal oxide semiconductor capacitor (MOSCAP) element 230 connected in parallel with the core circuit 220 in the power supply path. When event information is received, the power management circuit may apply the electrical shock to the MOSCAP element 230 such that the MOSCAP element 230 forms a current path for bypassing both ends of the core circuit 220 on the power supply path. In this example, a normal power voltage may not be provided to the core circuit 220, which may lead to restrictions on predetermined functions of the security apparatus 201.

Figure 5:
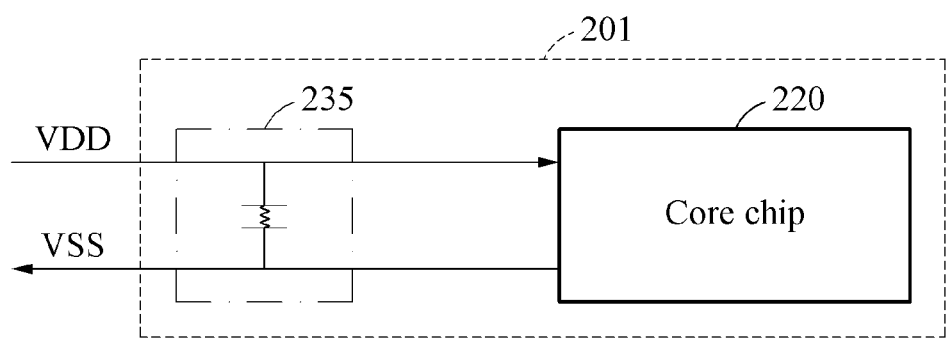

FIG. 5 illustrates an application example in which an anti-fuse element is selected instead of a MOSCAP element. As shown in the drawing, the security apparatus 201 may further include an anti-fuse element 235 connected in parallel with the core circuit 220 in the power supply path. When event information is received, a power management circuit may apply an electrical shock to the anti-fuse element 235 such that the anti-fuse element 235 forms a current path for bypassing both ends of the core circuit 220 on the power supply path. In this example, a result similar to the example of FIG. 4 may occur and thus, a normal power voltage may not be provided to the core circuit 220, which may prevent the security apparatus 201 from functioning normally.

Figure 6:
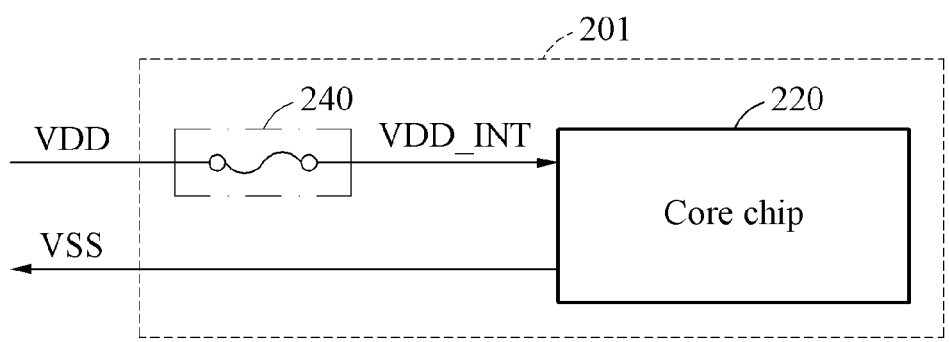
Figure 7:
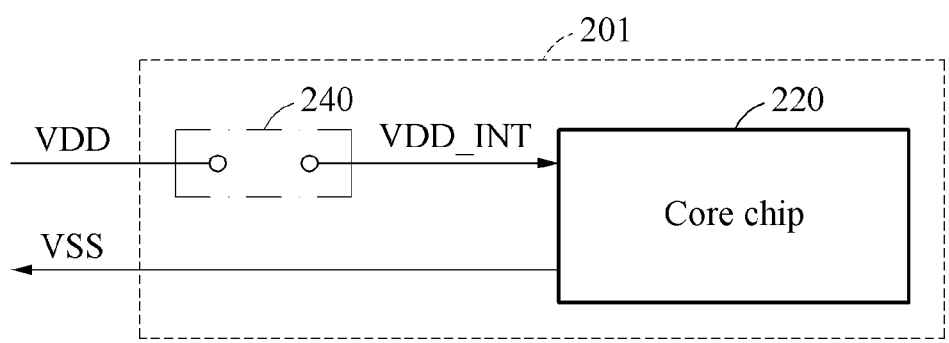

FIGS. 6 and 7 illustrate applications examples in which a fuse element 240 connected in series with the core circuit in the power supply path is selected. When event information is received, a power management circuit may apply an electrical shock to the fuse element 240 such that the fuse element 240 opens the power supply path to block a current path to the core circuit 220. Although a change in current path is different from the examples of FIGS. 4 and 5, a normal power voltage may not be transferred to the core circuit 220, which may prevent the security apparatus 201 from functioning normally.

In the foregoing examples, the event information indicating a security-vulnerable state may include an identification code for a stolen and lost state of the security apparatus. Here, the identification code may be received from at least one of an external terminal and a server connected to the security apparatus. The event information may also be generated by the security apparatus detecting a security attack instead of receiving from an external source. In this example, the security apparatus may further include a sensor (not shown) that senses a security attack on the security apparatus. The event information may include an identification code of an event in which the sensor senses the security attack. The security attack may include, but not be limited to, at least one of destruction of a device packaging for an invasive attack, detection of an electromagnetic field for a non-invasive attack, and signal collection for a power analysis attack.

In the examples described with reference to FIGS. 4 to 7, when the event information is received, the power management circuit may apply the electric shock to the core circuit to physically damage at least a portion of the core circuit. However, embodiments are not limited to the examples. Depending on an example, the power management circuit may not directly damage the core circuit in response to the event information being received. FIGS. 8 through 11 are diagrams illustrating security apparatuses changing security information to a different value in a security-vulnerable state according to example embodiments.

Figure 8:
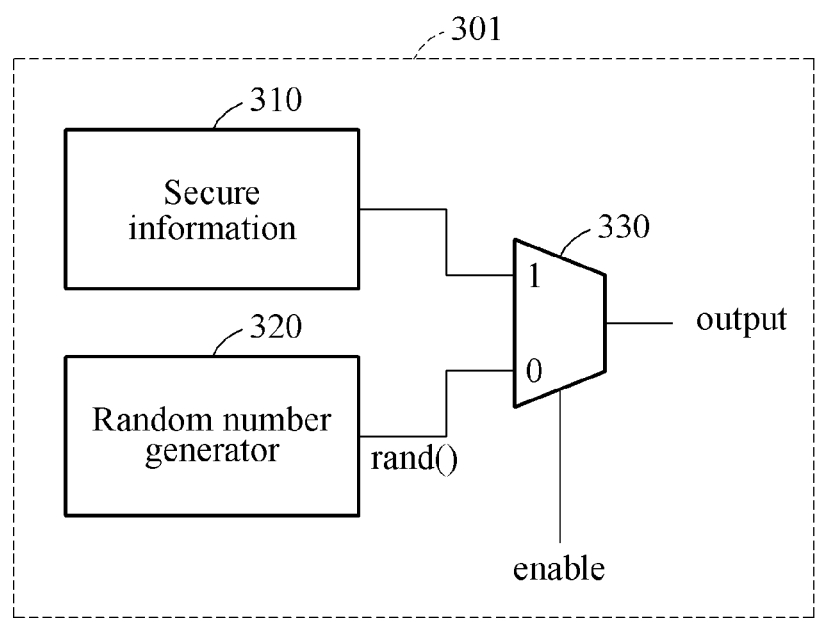
FIGS. 8 through 11 are diagrams illustrating security apparatuses changing security information to a different value in a security-vulnerable state according to example embodiments.

Referring to FIG. 8, a security apparatus 301 may include a key provider 310 having secure information such as an authentication key. The key provider may include a PUF that provides a random time-invariant digital value using a semiconductor process variation. The authentication key may include one of a first digital value provided directly from the PUF and a second digital value generated using the first digital value. The secure information may be transferred from the key provider 310 to a core circuit (not shown) such that a security function is performed.

When event information indicating that the security apparatus 301 is in a security-vulnerable state is received, a control logic may disallow the authentication key to be transmitted from the key provider to the core circuit. The control logic may include a selector 330 that selects the authentication key provided by the key provider 310 or a key different from the authentication key based on an enable signal value. The selector may include, for example, a multiplexer (MUX) element. In this example, when the event information is received, the control logic may change the enable signal value such that the different key is provided to the core circuit instead of the authentication key.

Here, the key transferred to an outside, for example, the core circuit instead of original secure information in response to the event information being received may be provided by a random number generator 320. The random number generator 320 may be a true random number generator and may also be a pseudo random number generator.

Figure 9:
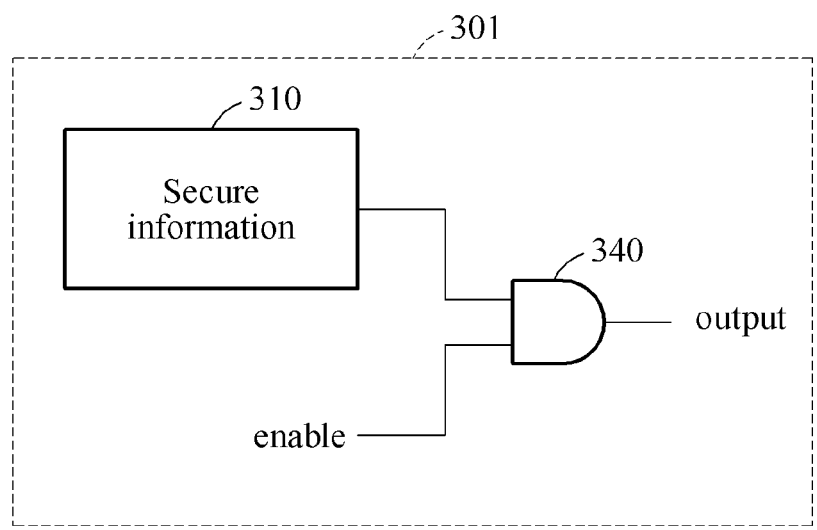

Referring to FIG. 9, the control logic may include a gate 340 that performs an AND operation on an enable signal value and a value of the authentication key. When the event information is not received, the control logic may maintain the enable signal value at a logic value of "1" such that the authentication key is provided to the core circuit. When the event information is received, the control logic may change the enable signal value to a logic value of "0" such that the authentication key is not provided to the core circuit.

Figure 10:
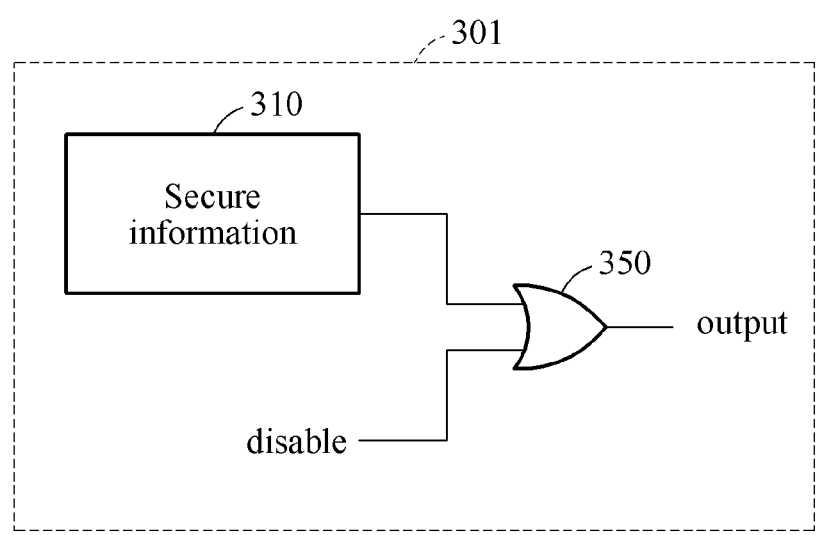

Referring to FIG. 10, the control logic may include a gate 350 that performs OR operation on an enable signal value and a value of the authentication key. When the event information is not received, the control logic may maintain the enable signal value at a logic value of "0" such that the authentication key is provided to the core circuit. When the event information is received, the control logic may change the enable signal value to a logic value of "1" such that the authentication key is not provided to the core circuit.

The gate performing the AND operation may be replaced by a gate performing a NAND operation. The gate performing the OR operation may be replaced by a gate performing a NOR operation. It is to be understood that the logic circuits described in the specification may be replaced by equivalent logic circuits having the same function and that such modified circuits are understood to be included in the example embodiments of the present disclosure to the extent that they can be understood and predicted by those skilled in the art.

Figure 11:
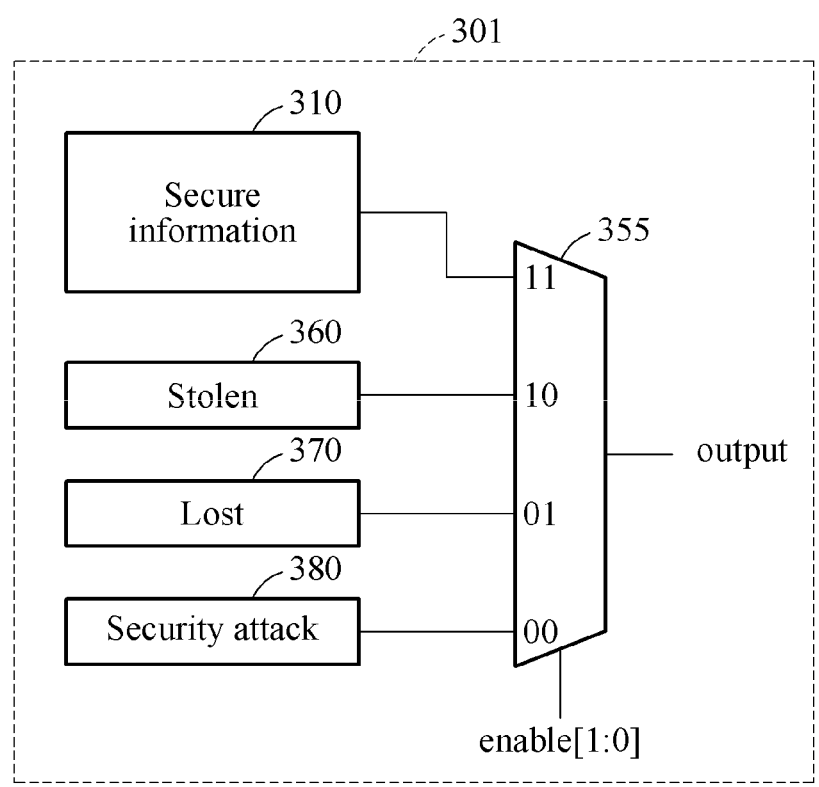

FIG. 11 illustrates an application example of processing information by verifying not only whether event information is associated with a security-vulnerable state or not but also a type of the security-vulnerable state. In addition to the authentication key provider 310 including normal secure information, a key provider 370 that provides a first identification code used for identifying a stolen state of a security apparatus, a key provider 360 that provides a second identification code used for identifying a lost state of the security apparatus, and a key provider 380 that provides a third identification code used for identifying a state in which a security attack to the security apparatus is sensed may be included.

Also, a control logic may use a MUX 355 to select secure information and output the selected information when the event is not received and, when the event is received, output a different identification value according to whether the event is lost, stolen, or a security attack and transfer the identification value to the core circuit. An authenticated side may take an appropriate action.

Figure 12:
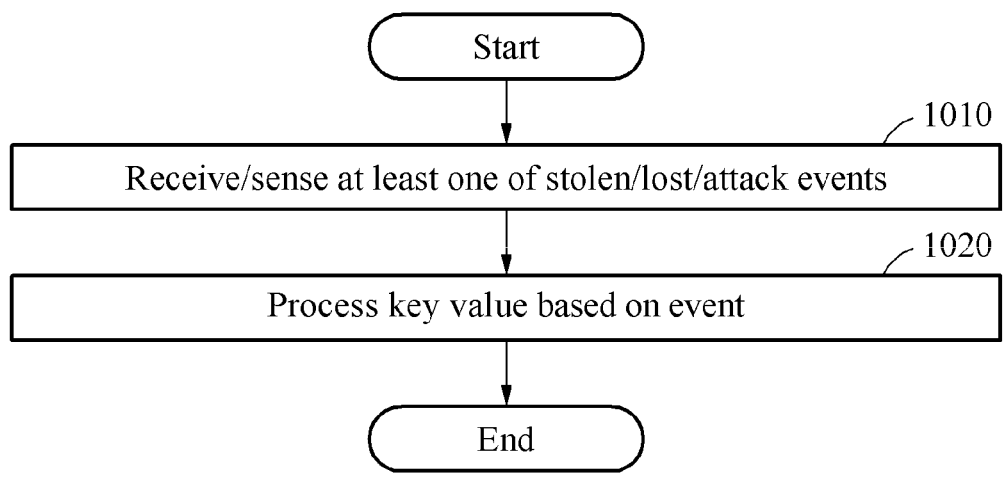
FIG. 12 is a flowchart illustrating an operation method of a security apparatus according to an example embodiment.

FIG. 12 is a flowchart illustrating an operation method of a security apparatus according to an example embodiment. In operation 1010, a security apparatus may receive an event that the security apparatus is in a security-vulnerable state. The event may be an event that the security apparatus is in at least one of stolen, lost, and attack states. The security apparatus may receive the event by receiving information from an external source or may autonomously sense the aforementioned states. Related description is also described above with reference to FIGS. 1 and 6.

In operation 1020, the security apparatus may change secure information value of the security apparatus to a random number value or a predetermined value representing secure information. Related description is also described above with reference to FIGS. 8 through 11.

Figure 13:
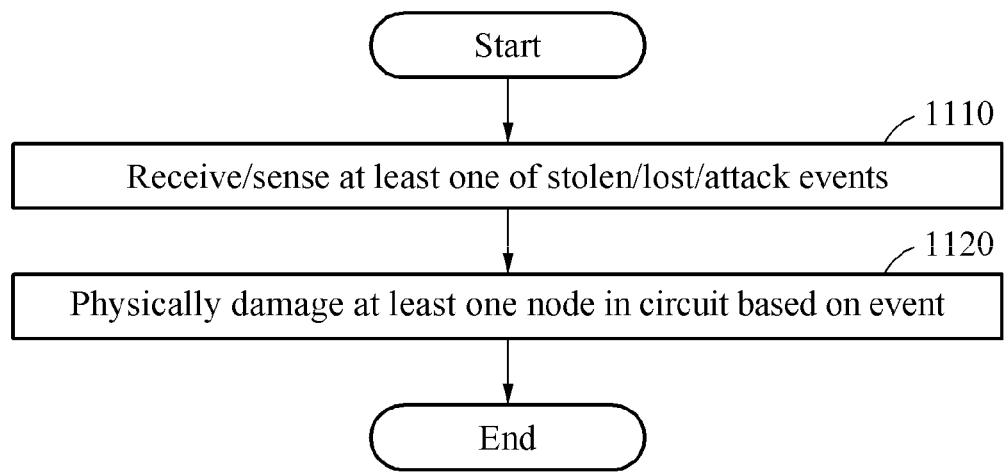
FIG. 13 is a flowchart illustrating an operation method of a security apparatus according to an example embodiment.

FIG. 13 is a flowchart illustrating an operation method of a security apparatus according to an example embodiment. A core circuit may perform a security function based on secure information such as an authentication key. In operation 1110, event information indicating that a security apparatus is in a security-vulnerable state may be sensed or received. In operation 1120, a power management circuit may apply at least one electrical shock of overvoltage and overcurrent to the security apparatus to cause a physical damage to the security apparatus such that the core circuit may not perform the security function normally. The electrical shock may be a shock causing a breakdown of a semiconductor element in the core circuit due to the application of the overvoltage. Also, the electrical shock may be a shock causing an electromigration in the core circuit due to the application of the overcurrent. It should be understood that the type of damage or the specific result may vary depending on the application or case and that any physical damage that interferes with the normal operation of the core circuit is included in such application. Related description is also described above with reference to FIGS. 3 through 7.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A security apparatus comprising:
    a core circuit configured to perform an authentication function using an authentication key, the core circuit further configured to perform the authentication function when the security apparatus is communicatively coupled to a terminal distinct from the security apparatus; and
    a power management circuit configured to, when event information indicating that the security apparatus is in a security-vulnerable state is received, apply at least one electrical shock of overvoltage and overcurrent to the security apparatus to cause a physical damage to the security apparatus such that the core circuit does not perform the authentication function normally,
    wherein the security-vulnerable state is selected from the group consisting of: loss of the security apparatus, theft of the security apparatus, detected destruction of a device packaging of the security apparatus, detection of an electromagnetic field indicating a non-invasive attack against the security apparatus, and detection of signal collection for a power analysis attack against the security apparatus, wherein a key provider comprises a physically unclonable function (PUF) that provides a random time-invariant digital value using a semiconductor processing variation, and the authentication key includes one of a first digital value provided directly from the PUF and a second digital value generated using the first digital value.

2. The security apparatus of claim 1, wherein when the event information is received, the power management circuit is configured to apply the electrical shock to the core circuit to physically damage at least a portion of the core circuit.

3. The security apparatus of claim 1, wherein the security apparatus further comprises a metal oxide semiconductor capacitor (MOSCAP) element connected in parallel with the core circuit in the power supply path, and when the event information is received, the power management circuit is configured to apply the electrical shock to the MOSCAP element such that the MOSCAP element forms a current path for bypassing both ends of the core circuit on the power supply path.

4. The security apparatus of claim 1, wherein the security apparatus further comprises an anti-fuse element connected in parallel with the core circuit in the power supply path, and when the event information is received, the power management circuit is configured to apply the electrical shock to the anti-fuse element such that the anti-fuse element forms a current path for bypassing both ends of the core circuit on the power supply path.

5. The security apparatus of claim 1, wherein the security apparatus further comprises a fuse element connected in series with the core circuit in the power supply path, and when the event information is received, the power management circuit is configured to apply the electrical shock to the fuse element such that the fuse element opens the power supply path to block a current path to the core circuit.

6. The security apparatus of claim 1, wherein the event information includes an identification code for a stolen or lost security apparatus state received from at least one of an external terminal and a server connected to the security apparatus.

7. The security apparatus of claim 1, further comprising:
a sensor configured to sense a security attack on the security apparatus,
wherein the event information includes an identification code of an event in which the sensor senses the security attack.

8. The security apparatus of claim 7, wherein the security attack includes at least one of destruction of a device packaging for an invasive attack, detection of an electromagnetic field for a non-invasive attack, and signal collection for a power analysis attack.

9. A security apparatus comprising:
a key provider having an authentication key;
a core circuit configured to perform an authentication function using the authentication key received from the key provider, the core circuit further configured to perform the authentication function when the security apparatus is communicatively coupled to a terminal distinct from the security apparatus; and a control logic configured to, when event information indicating that the security apparatus is in a security-vulnerable state is received, disallow the authentication key to be transmitted from the key provider to the core circuit such that the core circuit does not perform the authentication function normally, wherein the security-vulnerable state is selected from the group consisting of: loss of the security apparatus, theft of the security apparatus, detected destruction of a device packaging of the security apparatus, detection of an electromagnetic field indicating a non-invasive attack against the security apparatus, and detection of signal collection for a power analysis attack against the security apparatus, wherein the key provider comprises a physically unclonable function (PUF) that provides a random time-invariant digital value using a semiconductor processing variation, and the authentication key includes one of a first digital value provided directly from the PUF and a second digital value generated using the first digital value.

10. The security apparatus of claim 9, wherein the control logic comprises a selector configured to select the authentication key provided by the key provider or a random key different from the authentication key based on an enable signal value, and when the event information is received, the control logic is configured to change the enable signal value such that the random key is provided to the core circuit instead of the authentication key.

11. The security apparatus of claim 9, wherein the control logic comprises a gate configured to perform an AND operation on an enable signal value and a value of the authentication key, the control logic is configured to, when the event information is not received, maintain the enable signal value at a logic value of "1" such that the authentication key is provided to the core circuit, and the control logic is configured to, when the event information is received, change the enable signal value to a logic value of "0" such that the authentication key is not provided to the core circuit.

12. The security apparatus of claim 9, wherein the control logic comprises a gate configured to perform an OR operation on an enable signal value and a value of the authentication key, the control logic is configured to, when the event information is not received, maintain the enable signal value at a logic value of "0" such that the authentication key is provided to the core circuit, and the control logic is configured to, when the event information is received, change the enable signal value to a logic value of "1" such that the authentication key is not provided to the core circuit.

13. The security apparatus of claim 9, wherein the event information includes at least one of a first identification code used for identifying a stolen state of a security apparatus, a second identification code used for identifying a lost state of the security apparatus, and a third identification code used for identifying a state in which a security attack to the security apparatus is sensed.

14. The security apparatus of claim 13, wherein the control logic comprises a selector configured to receive different enable signals based on the event information and output different values corresponding to the enable signals.

15. An operation method of a security apparatus, the method comprising:

performing, by a core circuit, an authentication function using an authentication key, the core circuit performing the authentication function when the security apparatus is communicatively coupled to a terminal distinct from the security apparatus; and applying, by a power management circuit, at least one electrical shock of overvoltage and overcurrent to the security apparatus to cause a physical damage to the security apparatus such that the core circuit does not perform the authentication function normally when event information indicating that the security apparatus is in a security-vulnerable state is received, wherein the security-vulnerable state is selected from the group consisting of: loss of the security apparatus, theft of the security apparatus, detected destruction of a device packaging of the security apparatus, detection of an electromagnetic field indicating a non-invasive attack against the security apparatus, and detection of signal collection for a power analysis attack against the security apparatus, wherein a key provider comprises a physically unclonable function (PUF) that provides a random time-invariant digital value using a semiconductor processing variation, and the authentication key includes one of a first digital value provided directly from the PUF and a second digital value generated using the first digital value.

16. The operation method of claim 15, wherein when the event information is received, the power management circuit is configured to apply the electrical shock to the core circuit to physically damage at least a portion of the core circuit.

17. The operation method of claim 15, wherein when the event information is received, the power management circuit is configured to apply the electrical shock to a power supply path to the core circuit such that the core circuit does not perform the authentication function normally.

* * * * *